United States Patent
Xiong et al.

(10) Patent No.: US 11,463,149 B2
(45) Date of Patent: Oct. 4, 2022

(54) METHODS FOR TRANSMITTING UPLINK SIGNAL AND DOWNLINK SIGNAL, UE AND BASE STATION

(71) Applicant: Samsung Electronics Co., Ltd., Suwon-si (KR)

(72) Inventors: Qi Xiong, Beijing (CN); Chen Qian, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/322,648

(22) Filed: May 17, 2021

(65) Prior Publication Data

US 2021/0273713 A1    Sep. 2, 2021

Related U.S. Application Data

(63) Continuation of application No. 16/566,685, filed on Sep. 10, 2019, now Pat. No. 11,031,986, which is a (Continued)

(30) Foreign Application Priority Data

May 5, 2017    (CN) .......................... 201710313292.8

(51) Int. Cl.
*H04K 1/10* (2006.01)
*H04L 27/28* (2006.01)
(Continued)

(52) U.S. Cl.
CPC ........... *H04B 7/0695* (2013.01); *H04B 7/088* (2013.01); *H04L 1/16* (2013.01); *H04W 72/0406* (2013.01)

(58) Field of Classification Search
CPC ......... H04B 7/0695; H04B 7/088; H04L 1/16; H04W 72/0406; H04W 72/085
(Continued)

(56) References Cited

U.S. PATENT DOCUMENTS 9,106,377 B2    8/2015    Ji et al.
9,871,640 B2    1/2018    Kim et al.
(Continued)

FOREIGN PATENT DOCUMENTS

CN    101489273 A    7/2009
CN    102577169 A    7/2012
(Continued)

OTHER PUBLICATIONS

International Search Report dated Sep. 7, 2018 in connection with International Patent Application No. PCT/KR2018/005211.
(Continued)

*Primary Examiner* — Phuong Phu

(57) ABSTRACT

Embodiments of the present disclosure provide methods for transmitting an uplink signal and a downlink signal. A method for transmitting an uplink signal comprises detecting whether there is a beam failure; if there is a beam failure, determining at least one of whether there is a candidate downlink transmission beam(s) or candidate downlink transmission beam information; and transmitting a beam failure recovery request message to a base station, the beam failure recovery request message being used for informing the base station of at least one of whether there is a candidate downlink transmission beam(s) or candidate downlink transmission beam information. A method for transmitting a downlink signal comprises detecting a beam failure recovery request message, determining at least one of whether there is a candidate downlink transmission beam(s) or candidate downlink transmission beam information in the UE; and transmitting a feedback message corresponding to the beam failure recovery request message.

20 Claims, 10 Drawing Sheets

Related U.S. Application Data continuation of application No. 15/971,679, filed on May 4, 2018, now Pat. No. 10,985,825.

(51) Int. Cl.
  *H04B 7/06* (2006.01)
  *H04L 1/16* (2006.01)
  *H04B 7/08* (2006.01)
  *H04W 72/04* (2009.01)

(58) Field of Classification Search
  USPC .............................. 375/260, 346, 220, 222
  See application file for complete search history.

(56) References Cited

U.S. PATENT DOCUMENTS

| | | | |
|---|---|---|---|
| 10,003,442 B2 | 6/2018 | Kang et al. | |
| 10,014,920 B2 | 7/2018 | Hammarwall et al. | |
| 10,985,825 B2* | 4/2021 | Xiong | H04B 7/0695 |
| 11,031,986 B2* | 6/2021 | Xiong | H04B 7/0695 |
| 2008/0225960 A1 | 9/2008 | Kotecha et al. | |
| 2013/0301582 A1 | 11/2013 | Jiang et al. | |
| 2016/0198474 A1 | 7/2016 | Raghavan et al. | |
| 2016/0353510 A1* | 12/2016 | Zhang | H04B 7/0695 |
| 2017/0094531 A1 | 3/2017 | Kakishima et al. | |
| 2017/0325049 A1 | 11/2017 | Basu Mallick et al. | |
| 2018/0234960 A1 | 8/2018 | Nagaraja et al. | |
| 2018/0279284 A1 | 9/2018 | Wang et al. | |
| 2018/0279318 A1* | 9/2018 | Wang | H04W 72/085 |

FOREIGN PATENT DOCUMENTS

| | | |
|---|---|---|
| CN | 103039026 A | 4/2013 |
| CN | 104782056 A | 7/2015 |
| CN | 105432026 A | 3/2016 |
| CN | 106506117 A | 3/2017 |
| WO | 2009089782 A1 | 7/2009 |
| WO | 2017/024516 A1 | 2/2017 |

OTHER PUBLICATIONS

Written Opinion of the International Searching Authority dated Sep. 7, 2018 in connection with International Patent Application No. PCT/KR2018/005211.

Huawei, et al., "Link recovery procedure for beam failure", 3GPP TSG RAN WG1 Meeting #88b, Apr. 3-7, 2017, 7 pages, R1-1704230.
Samsung, "Discussion on recovery from beam failure", 3GPP TSG RAN WG1 Meeting #88bis, Apr. 3-7, 2017, 6 pages, R1-1705343.
NTT DOCOMO, Inc., "Further views on mechanism to recover from beam failure", 3GPP TSG RAN WG1 Meeting #88bis, Apr. 3-7, 2017, 6 pages, R1-1705719.
Ericsson, "Beam failure detection and beam recovery actions", 3GPP TSG-RAN WG1 Meeting #88bis, Apr. 3-7, 2017, 6 pages, R1-1705893.
Qualcomm Incorporated, "Beam recovery procedures", TSG-RAN WG1 #88bis, R1-1705582, 4 pages.
CATT, "Considerations on beam recovery mechanism", 3GPP TSG RAN WG1 Meeting #88, Feb. 13-17, 2017, R1-1702078, 4 pages.
Samsung, "UE triggering conditions of beam recovery", 3GPP TSG-RAN WG2 2017 RAN2#97 Meeting, Feb. 13-17, 2017, R2-1702002, 4 pages.
MediaTek et al., "WF on Beam Failure Recovery", 3GPP TSG RAN WG1 Meeting #88b, Apr. 3-7, 2017, R1-1706633, 6 pages.
Supplementary European Search Report dated Mar. 18, 2020 in connection with European Patent Application No. 18 79 4623, 10 pages.
Office Action dated Feb. 25, 2021 in connection with India Patent Application No. 201927048085, 5 pages.
The First Office Action dated Dec. 20, 2021, in connection with Chinese Application No. 202110542413.2, 23 pages.
The First Office Action dated Nov. 3, 2021, in connection with Chinese Application No. 201710313292.8, 21 pages.
Korean Intellectual Property Office, "Notice of Non-Final Rejection" dated Jun. 7, 2022, in connection with Korean Patent Application No. 10-2019-7035838, 11 pages.
China National Intellectual Property Administration, "The Second Office Action" dated Jul. 4, 2022, in connection with Chinese Patent Application No. 201710313292.8, 23 pages.
China National Intellectual Property Administration, "The Third Office Action" dated Jun. 7, 2022, in connection with Chinese Patent Application No. 202110542413.2, 17 pages.
Samsung et al., "WF on Recovery from beam failure," R1-1706681, 3GPP TSG-RAN WG1 Meeting #88b, Spokane, USA, Apr. 3-7, 2017, 4 pages.
Spreadtrum Communications, "Discussion on UE initiated recovery from beam failure," R1-1705153, 3GPP TSG-RAN NG1 Meeting #88b, Spokane, USA, Apr. 3-7, 2017, 3 pages.
China National Intellectual Property Administration, "Search Report" dated Aug. 19, 2022, in connection with Chinese Patent Application No. 2021105424132, 6 pages.

\* cited by examiner

METHODS FOR TRANSMITTING UPLINK SIGNAL AND DOWNLINK SIGNAL, UE AND BASE STATION

CROSS-REFERENCE TO RELATED APPLICATIONS

This application is a continuation of U.S. patent application Ser. No. 16/566,685 filed on Sep. 10, 2019, which is a continuation of U.S. patent application Ser. No. 15/971,679 filed on May 4, 2018, now U.S. Pat. No. 10,985,825 issued Apr. 20, 2021, which is based on and claims priority under 35 U.S.C. § 119 to Chinese Patent Application No. 201710313292.8 filed on May 5, 2017 in the State Intellectual Property Office of China, the disclosures of which are herein incorporated by reference in their entirety.

BACKGROUND

1. Field

The present disclosure relates to the technical field of signal transmission, and in particular to methods, a UE and a base station for transmitting an uplink signal and downlink signal.

2. Description of Related Art

The rapid development of information industry, particularly the increasing demand from the mobile Internet and the Internet of Things (IoT), brings about unprecedented challenges in the future mobile communications technology. According to the ITU-R M. [IMT.BEYOND 2020.TRAFFIC] issued by the International Telecommunication Union (ITU), it can be expected that, by 2020, mobile services traffic will grow nearly 1,000 times as compared with that in 2010 (4G era), and the number of user device connections will also be over 17 billion, and with a vast number of IoT devices gradually expand into the mobile communication network, the number of connected devices will be even more astonishing. In response to this unprecedented challenge, the communications industry and academia have prepared for 2020s by launching an extensive study of the fifth generation of mobile communications technology (5G). Currently, in ITU-R M. [IMT.VISION] from ITU, the framework and overall objectives of the future 5G have been discussed, where the demands outlook, application scenarios and various important performance indexes of 5G have been described in detail. In terms of new demands in 5G, the ITU-R M. [IMT.FUTURE TECHNOLOGY TRENDS] from ITU provides information related to the 5G technology trends, which is intended to address prominent issues such as significant improvement on system throughput, consistency of the user experience, scalability so as to support IoT, delay, energy efficiency, cost, network flexibility, support for new services and flexible spectrum utilization, etc.

The performance of random access directly influences the user experience of UE. In conventional wireless communication systems, such as Long Term Evolution (LTE) and LTE-Advanced, the random access procedure is applied in many scenarios, for example, establishment of initial connections, cell handover, re-establishment of uplink connections, re-establishment of RRC connections, or the like. And the random access is divided into contention-based random access and contention-free random access, depending upon whether the UE uses the preamble sequence resources exclusively or not. Since a preamble sequence is selected from the same preamble sequence resources during the attempt of establishment of an uplink connection by UEs in the contention-based random access, it may be possible for a plurality of UEs to select a same preamble sequence to be transmitted to the base station. Hence, a contention resolution mechanism becomes an important research aspect of random access. How to reduce the contention probability and how to rapidly resolve contentions that have already taken place are key indicators that influence the performance of random access.

The contention-based random access process in LTE-A includes four steps, as shown in FIG. 1. In the first step, a user randomly selects a preamble sequence from a preamble sequence resource pool and transmits the preamble sequence to a base station; and the base station performs correlation detection on the received signal, so as to identify the preamble sequence transmitted by the user. In the second step, the base station transmits a Random Access Response (RAR) to the UE, the RAR containing an identifier of a random access preamble sequence, a timing advance instruction determined according to a time delay between the UE and the base station, a Cell-Radio Network Temporary Identifier (TC-RNTI), and time-frequency resources allocated for the UE to perform uplink transmission next time. In the third step, the user transmits a Message 3 (Msg3) to the base station according to information in the RAR. The Msg3 contains information such as a UE terminal identifier and an RRC link request, wherein the UE terminal identifier is an identifier that is unique to the UE and used for resolving contention. In the fourth step, the base station transmits a contention resolution identifier to the UE, the contention resolution identifier containing a UE identifier corresponding to a user who wins in the contention resolution. The UE upgrades TC-RNTI to C-RNTI upon detecting its identifier, and transmits an Acknowledgement (ACK) signal to the base station to complete the random access process and waits for the scheduling of the base station. Otherwise, the user will start a new random access process after a certain delay.

For a contention-free random access procedure, the base station may allocate a preamble sequence to UE since it has known the identifier of the UE. Hence, the UE does not need to randomly select a sequence when transmitting the preamble sequence, and instead, it uses an allocated preamble sequence. The base station will transmit a corresponding random access response after detecting the allocated preamble sequence, the random access response containing timing advance, allocation of uplink resources and other information. After receiving the random access response, the UE deems that the uplink synchronization is completed and waits for the further scheduling of the base station. Therefore, a contention-free random access process just comprises 2 steps: the step one is to transmit the preamble sequence, and the step 2 is to transmit the random access response. Wherein:

The random access process in the LTE is applicable to the following scenarios:
1. initial access under RRC IDLE;
2. reestablishment of RRC connection;
3. cell handover;
4. when the uplink is nonsynchronous, the downlink data arrives in an RRC connected state and requests a random access process;
5. when the uplink is nonsynchronous or no resource is allocated for a scheduling request in a PUCCH resource, the uplink data arrives in an RRC connected state and requests a random access process; and 6. positioning.

Wherein, in the LTE, the six scenarios use the same random access steps. In the existing 5G standard discussion, communication systems adopt a beamforming mode. However, when a UE detects that there is a beam failure, that is, when the quality of a downlink beam does not fulfill a certain condition any more, how the UE recovers the beam failure and informs a base station of new available downlink transmission beams or whether there are new available downlink transmission beams become a problem.

SUMMARY

To overcome the technical problems or at least partially solve the technical problems, the following technical solutions are particularly provided.

According to one aspect, an embodiment of the present disclosure provides a method for transmitting an uplink signal, comprising steps of: detecting, by a user equipment (UE), whether there is a beam failure; determining at least one of whether there is a candidate downlink transmission beam(s) and candidate downlink transmission beam information, if the UE detects that there is a beam failure; and transmitting, by the UE and according to a result of determining, a beam failure recovery request message to a base station, the beam failure recovery request message being used for informing the base station of at least one of whether there is a candidate downlink transmission beam(s) and candidate downlink transmission beam information.

According to another aspect, an embodiment of the present disclosure further provides a user equipment (UE), comprising: a transceiver configured to detect whether there is a beam failure; a first determination module configured to determine at least one of whether there is a candidate downlink transmission beam(s) and candidate downlink transmission beam information if the transceiver detects that there is a beam failure; and the transceiver configured to transmit, according to a result of determination of the controller, a beam failure recovery request message to a base station, wherein the beam failure recovery request message is used for informing the base station of at least one of whether there is a candidate downlink transmission beam(s) and candidate downlink transmission beam information.

According to another aspect, an embodiment of the present disclosure further provides a method for transmitting a downlink signal, comprising steps of: detecting, by a base station, a beam failure recovery request message; determining, by the base station and according to the detected beam failure recovery request message, at least one of whether there is a candidate downlink transmission beam(s) and candidate downlink transmission beam information in a user equipment; and transmitting, by the base station and according to a result of determining, a feedback message corresponding to the beam failure recovery request message.

According to another aspect, an embodiment of the present disclosure further provides a base station, comprising: a transceiver configured to detect a beam failure recovery request message; a controller configured to determine, according to the beam failure recovery request message detected by the transceiver, at least one of whether there is a candidate downlink transmission beam(s) and candidate downlink transmission beam information in a user equipment; and the transceiver configured to transmit, by the base station and according to a result of determination of the controller, a feedback message corresponding to the beam failure recovery request message.

The present disclosure provides methods, a UE and a base station for transmitting an uplink signal and a downlink signal. In the present disclosure, a UE detects whether there is a beam failure currently, determines at least one of whether there is a candidate downlink transmission beam(s) and candidate downlink transmission beam information currently if it is detected that there is a beam failure currently, and transmits, according to a result of determining, a beam failure recovery request message to a base station. And, the base station detects the beam failure recovery request message, and determines, according to the detected beam failure recovery request message, at least one of whether there is a candidate downlink transmission beam(s) and candidate downlink transmission beam information currently in the UE, and transmits, according to a result of determining, a feedback message corresponding to the beam failure recovery request message, wherein the beam failure recovery request message is used for informing the base station of at least one of whether there is a candidate downlink transmission beam(s) and candidate downlink transmission beam information currently. In other words, in the present disclosure, upon detecting that there is a beam failure and there is a new candidate beam currently, a UE transmits a result of detection to a base station, so that the base station can know that there is a beam failure currently in the UE and that there is a candidate downlink transmission beam(s) currently in the UE. Thus, upon detecting that there is a beam failure, the UE can inform the base station of a new available downlink transmission beam or whether there is a new available downlink transmission beam.

Additional aspects and advantages of the present disclosure will be partially appreciated and become apparent from the description below, or will be well learned from the practices of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
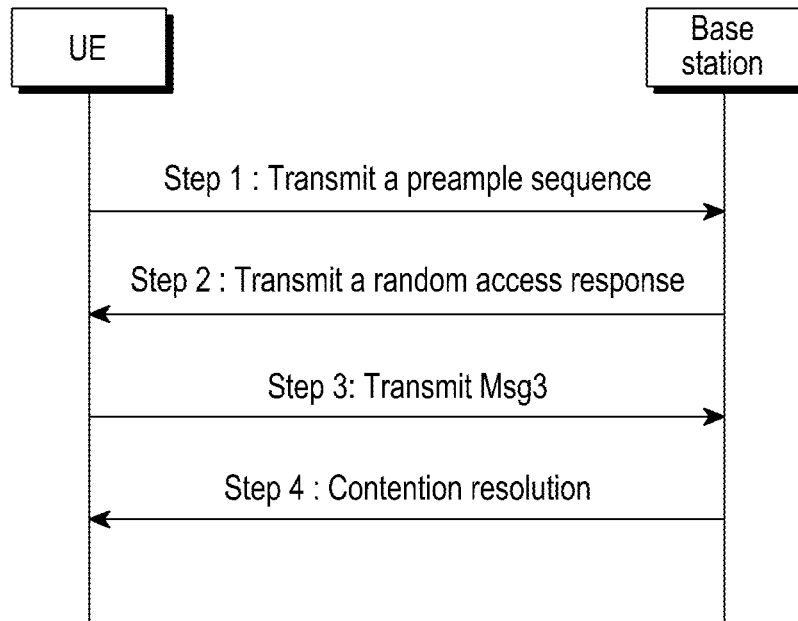
FIG. 1 illustrates a schematic flowchart of a conventional contention-based random access.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements there between. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present disclosure belongs. It should be further understood that terms, such as those defined in commonly used dictionaries, should be interpreted as having a meaning that is consistent with their meanings in the context of the art and will not be interpreted in an idealized or overly formal sense unless expressly so defined herein.

It should be understood by one person of ordinary skill in the art that the term "terminal" and "terminal equipment" as used herein compasses not only devices with a wireless signal receiver having no emission capability but also devices with receiving and emitting hardware capable of carrying out bidirectional communication over a bidirectional communication link. Such devices can comprise cellular or other communication devices with a single-line display or multi-line display or without a multi-line display; Personal Communication Systems (PCSs) with combined functionalities of speech, data processing, facsimile and/or data communication; Personal Digital Assistants (PDAs), which may include RF receivers, pagers, internet networks/intranet accesses, web browsers, notepads, calendars and/or Global Positioning System (GPS) receivers; and/or conventional laptop and/or palmtop computers or other devices having and/or including a RF receiver. The "terminal" and "terminal equipment" as used herein can be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it can be a PDA, a Mobile Internet Device (MID) and/or a mobile phone with a music/video playback function, or can be equipment such as a smart TV and a set-top box.

In a beamforming system, for the beam failure recovery, there are four aspects: beam failure detection, new candidate beam identification, beam failure recovery request transmission, and UE monitors gNB response for beam failure recovery request. Wherein, when a user equipment (UE) needs to transmit a beam failure recovery request, it may inform a base station of its beam failure request in a manner similar to the random access. The UE may also explicitly or implicitly inform the base station of information such as available candidate beams.

Wherein, for implicitly informing, the transmission way may be as follows: binding downlink signals using different downlink transmission beams with beam failure recovery request resources, wherein it may be stipulated that the beam failure recovery request resources may be consistent in time position of random access channel resources, but occupy different frequency-domain positions. On the UE side, after a beam failure is detected, by detecting and measuring an downlink signal, a candidate downlink transmission beam may be obtained or it may be known whether there is a candidate downlink transmission beam(s); and then, by using a binding relationship, the UE selects, according to a result of downlink measurement, a beam failure recovery request resource to transmit a beam failure recovery request signal (which may be a preamble signal, a reference signal in a predetermined format, or a control/data signal in a predetermined format, etc.). According to the detected beam failure recovery request signal and the binding relationship, the base station may infer the new candidate downlink transmission beam implicitly informed by the user.

Wherein, the downlink signal of the downlink transmission beam may be a periodic Channel State Information-Reference Signal (CSI-RS) or a synchronous signal block (SS Block).

Wherein, for explicitly informing, the transmission way may be as follows: when a UE detects a beam failure, information about a new candidate downlink transmission beam or whether there is a new candidate downlink transmission beam is directly transmitted to a base station by uplink. Wherein, the transmission way of the UE may be scheduling-free transmission by using a predetermined scheduling-free time-frequency resource. Alternatively, the UE may transmit a beam failure recovery signal (which may be a scheduling request) to acquire an uplink grant by an uplink control channel and then perform uplink transmission by using the scheduled time-frequency resource.

Figure 2A:
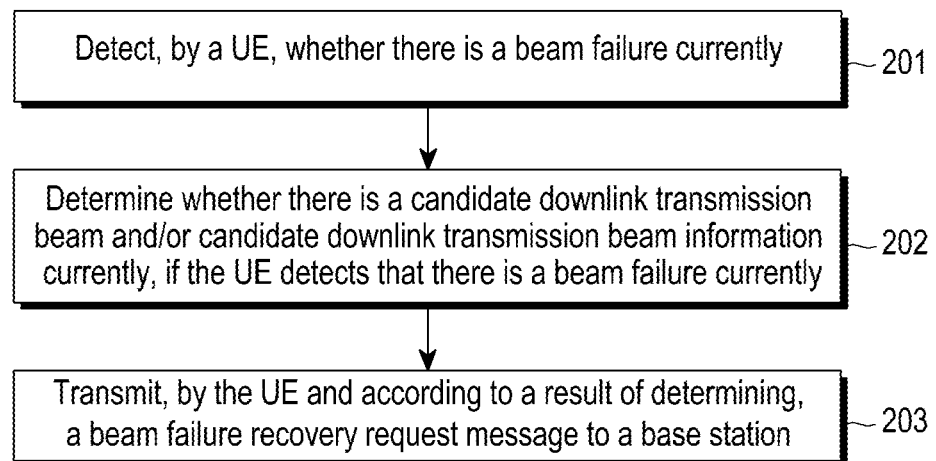
FIG. 2A illustrates a schematic flowchart of a method for transmitting an uplink signal according to an embodiment of the present disclosure.

FIG. 2A is a schematic flowchart of a method for transmitting an uplink signal according to an embodiment of the present disclosure.

Step 201: A UE detects whether there is a beam failure currently; step 202: if the UE detects that there is a beam failure currently, the UE determines whether there is a candidate downlink transmission beam(s) and/or candidate downlink transmission beam information currently; and step 203: the UE transmits, according to a result of determining, a beam failure recovery request message to a base station. Wherein, the beam failure recovery request message is used for informing the base station of whether there is a candidate downlink transmission beam(s) and/or candidate downlink transmission beam information currently.

Further, the step 201 may comprise: detecting, by the UE, whether the receiving power of a beam failure detection reference signal is less than or equal to a predetermined value; and, determining, by the UE and according to a result of detection, whether there is a beam failure currently.

Further, the step 202 may comprise: if the UE detects that there is a beam failure currently, determining, by the UE and by using channel state information-reference signal configured by the network for beam management and/or a SS-Block configured by the network, whether there is a candidate downlink transmission beam(s) and/or candidate downlink transmission beam information currently.

Wherein, after the step 202, the method further comprises: determining, by the UE and according to a result of determining and a binding relationship, a time-frequency resource used for transmitting the beam failure recovery request message and/or a signal resource used for transmitting the beam failure recovery request message.

Wherein, the binding relationship is a binding relationship between the candidate downlink transmission beam information and/or the information of whether there is a candidate downlink transmission beam(s) currently and the time-frequency resource and/or signal resource used for transmitting the beam failure recovery request message.

Further, the step 203 comprises: transmitting, by the UE and by using the determined time-frequency resource and/or signal resource used for transmitting the beam failure recovery request message, the beam failure recovery request message to the base station.

Further, the way of determining, by the UE and according to a result of determining and a binding relationship, a time-frequency resource used for transmitting the beam failure recovery request message comprises:

A step of if there is one or more candidate downlink transmission beams currently and the information of one or more candidate downlink transmission beam(s) correspond to one time-frequency resource used for transmitting the beam failure recovery request message, this time-frequency resource is determined as the time-frequency resource used for transmitting the beam failure recovery request message, and A step of if there is one or more candidate downlink transmission beams currently and the information of one or more new candidate downlink transmission beam(s) correspond to multiple time-frequency resources used for transmitting the beam failure recovery request message, the UE selects in a predetermined way a time-frequency resource as the time-frequency resource used for transmitting the beam failure recovery request message.

Wherein, the predetermined way comprises at least one of the following: equiprobable selection and priority-based selection.

Further, the way of determining, by the UE and according to a result of determining and a binding relationship, a signal resource used for transmitting the beam failure recovery request message comprises step of that if there are multiple candidate downlink transmission beams currently and information of multiple candidate downlink transmission beams, and each of the multiple candidate downlink transmission beams corresponds to a different set of signal resources for the beam failure recovery message, the UE randomly selects, from the set of signal resources for the beam failure recovery request message corresponding to each candidate downlink transmission beam, a signal resource as the signal resource used for transmitting the beam failure recovery request message, and a step of if there are multiple candidate downlink transmission beams currently and information of multiple candidate downlink transmission beams, and the multiple candidate downlink transmission beams correspond to a same set of signal resources for the beam failure recovery request message, the UE randomly selects, from the set of signal resources for the beam failure recovery request message, a signal resource as the signal resource used for transmitting the beam failure recovery request message.

Wherein, the UE acquires the binding relationship and a beam failure recovery request resource by using at least one of a downlink control channel, a downlink broadcast channel and a downlink shared channel.

Further, the step of determining, by the UE and according to a result of determination and a binding relationship, a time-frequency resource used for transmitting the beam failure recovery request message and/or a signal resource used for transmitting the beam failure recovery request message may comprise: if the UE determines that there is no candidate downlink transmission beam currently, determining, by the UE and according to the acquired network configuration information, a corresponding time-frequency resource used for transmitting the beam failure recovery request message and/or a corresponding signal resource used for transmitting the beam failure recovery request message.

Figure 2B:
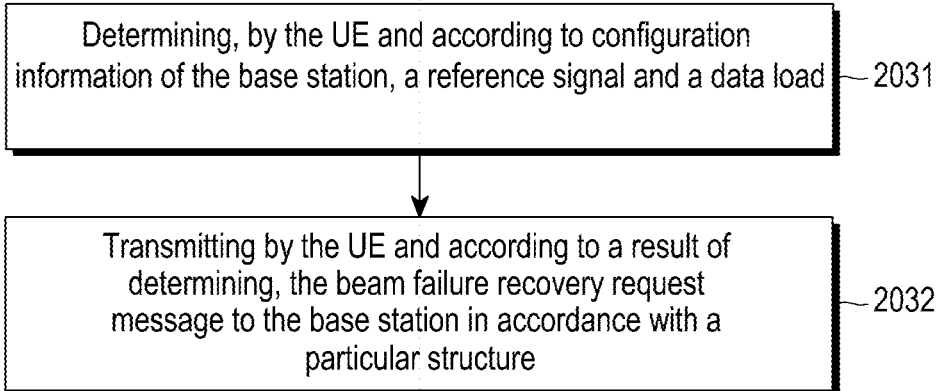
FIG. 2B illustrates a schematic flowchart exemplarily showing the step 203 of FIG. 2A.

FIG. 2B is a schematic flowchart exemplarily showing the step 203 of FIG. 2A.

Referring FIG. 2B, step 203 of FIG. 2A may comprises step 2031, which includes determining, by the UE and according to configuration information of the base station, a reference signal and a data load, and step 2032, which includes transmitting, by the UE and according to the result of determination, the beam failure recovery request message to the base station in accordance with a particular structure.

Wherein, the particular structure comprises the reference signal and the data load. The data load may include a payload.

For example, the step of determining, by the UE and according to configuration information of the base station, the reference signal and the data load may comprise: determining, by the UE and according to the configuration information of the base station, the reference signal as a reference signal specific to the UE and the data load as a first data load; or, determining, by the UE and according to the configuration information of the base station, the reference signal as a reference signal not specific to the UE and the data load as a second data load.

Wherein, the first data load comprises a candidate downlink transmission beam existence indicator and/or one or more candidate downlink transmission beam index determined by the UE; the second data load at least comprises a candidate downlink transmission beam existence indicator and/or one or more candidate downlink transmission beam index determined by the UE and an unique identifier of the UE; and, the candidate downlink transmission beam existence indicator is used for identifying whether there is a candidate downlink transmission beam(s) currently in the UE, and the one or more candidate downlink transmission beam index determined by the UE is used for identifying one or more candidate downlink transmission beam determined by the UE. Wherein, the unique identifier of the UE may comprise at least one of the following: a Cell Radio Network Temporary Identifier (C-RNTI), a Serving-Temporary Mobile Subscriber Identity (S-TMSI), and a random number generated by the UE itself.

Wherein, the UE acquires the configuration information of the base station by any one of a downlink control channel, a downlink broadcast channel and a downlink shared channel.

Further, the step 203 may further comprise a step of that the UE transmits a beam failure recovery request message by a Physical Uplink Control Channel (PUCCH).

Wherein, the beam failure recovery request message comprises beam failure state indication information and a candidate downlink transmission beam existence indicator and/or one or more candidate downlink transmission beam index determined by the UE.

Figure 2C:
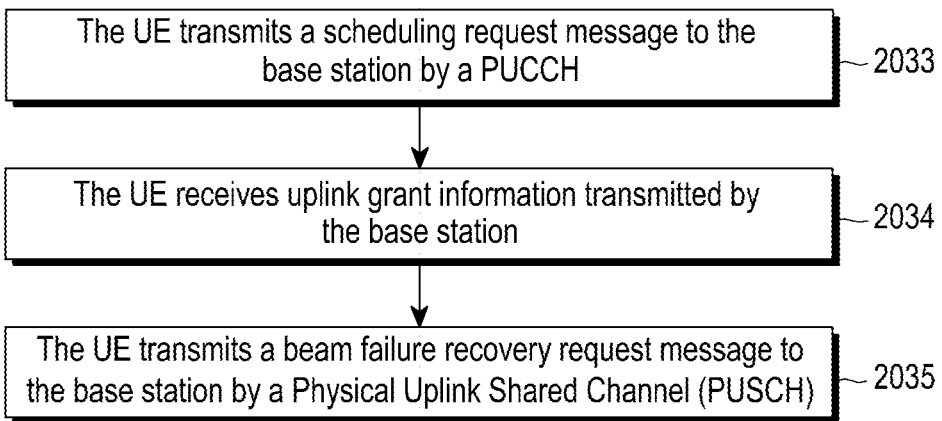
FIG. 2C illustrates a schematic flowchart exemplarily showing the step 203 of FIG. 2A.

FIG. 2C is a schematic flowchart exemplarily showing the step 203 of FIG. 2A.

Referring to FIG. 2C, step 203 of FIG. 2A may comprise steps 2033, 2034, and 2035. In Step 2033, the UE transmits a scheduling request message to the base station by a PUCCH. In step 2034, the UE receives uplink grant information transmitted by the base station. In step 2035, the UE transmits a beam failure recovery request message to the base station by a Physical Uplink Shared Channel (PUSCH).

Wherein, the beam failure recovery request message comprises beam failure state indication information and a candidate downlink transmission beam existence indicator and/or one or more candidate downlink transmission beam index determined by the UE.

Figure 3:
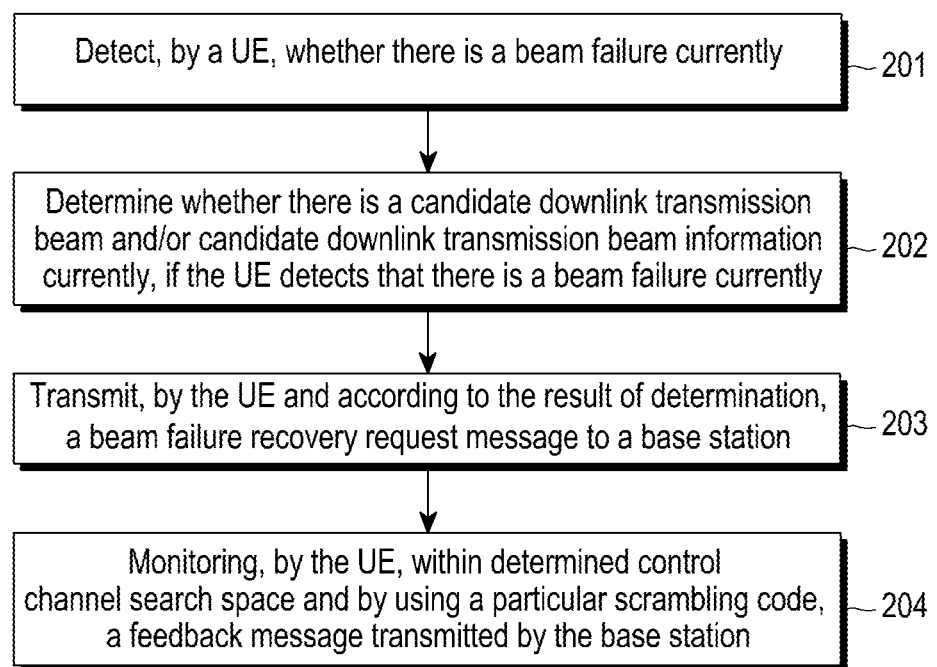
FIG. 3 illustrates a schematic flowchart of a method for transmitting an uplink signal according to an embodiment of the present disclosure.

FIG. 3 is a schematic flowchart of a method for transmitting an uplink signal according to an embodiment of the present disclosure. In the description of FIG. 3, the parts that are the same as those in FIG. 2A are omitted.

Step 204: monitoring, by the UE, within the determined control channel search space and by using a particular scrambling code, a feedback message transmitted by the base station.

Wherein, the feedback message is a feedback message corresponding to the beam failure recovery request message.

Wherein, the determined control channel search space comprises at least one of the following: a reference control channel search space configured by the base station; a downlink control channel search space between the UE and the base station for the previous time; and a particular control channel search space configured by the UE when the UE is in an accessed state, the particular control channel search space being used for searching the feedback message.

Wherein, the particular scrambling code comprises at least one of the following: a Beam Failure Recovery Radio Network Temporary Identity (BFR-RNTI), a Cell Radio Network Temporary Identifier (C-RNTI), a Serving-Temporary Mobile Subscriber Identity (S-TMSI), and a particular random number.

The method further comprise a step of that if the UE fails to detect the feedback message transmitted by the base station and the number of transmissions of the beam failure recovery request message by the UE is not greater than the maximum permissible number of transmissions of the beam failure recovery request message, the UE gradually increases, according to a predetermined power prompt interval, a transmitting power for transmitting the beam failure recovery request message, and transmits the beam failure recovery request message.

The method further comprises a step of that if the UE fails to detect the feedback message transmitted by the base station and the number of transmissions of the beam failure recovery request message by the UE reaches the maximum permissible number of transmissions of the beam failure recovery request message, the UE may transmit a failure message to a higher layer, the failure message being used for informing the higher layer that the beam failure recovery request is failed.

The method further comprises a step of that if the UE fails to detect the feedback message transmitted by the base station, the UE may directly transmit a failure message to the higher layer.

Wherein, when there is no candidate downlink transmission beam currently, the UE performs the following operations: if there is no candidate downlink transmission beam currently, the UE transmits a random access request message to the base station to perform random access; or, if there is no candidate downlink transmission beam currently, the UE transmits a cell reselection request message to the base station to perform cell reselection.

This embodiment of the present disclosure provides a method for transmitting an uplink signal. In this embodiment of the present disclosure, a UE detects whether there is a beam failure currently, determines whether there is a candidate downlink transmission beam(s) and/or candidate downlink transmission beam information currently if it is detected that there is a beam failure currently, and transmits, according to the result of determination, a beam failure recovery request message to a base station; and, the base station detects the beam failure recovery request message, and determines, according to the detected beam failure recovery request message, whether there is a candidate downlink transmission beam(s) and/or candidate downlink transmission beam information currently in the UE, and transmits, according to the result of determination, a feedback message corresponding to the beam failure recovery request message, wherein the beam failure recovery request message is used for informing the base station of whether there is a candidate downlink transmission beam(s) and/or candidate downlink transmission beam information currently. In other words, in this embodiment of the present disclosure, upon detecting that there is a beam failure and there is a new candidate beam currently, a UE transmits the result of detection to a base station, so that the base station may know that there is a beam failure currently in the UE and that there is a candidate downlink transmission beam(s) currently in the UE. Thus, upon detecting that there is a beam failure, the UE may inform the base station of a new available downlink transmission beam or whether there is a new available downlink transmission beam.

Figure 4A:
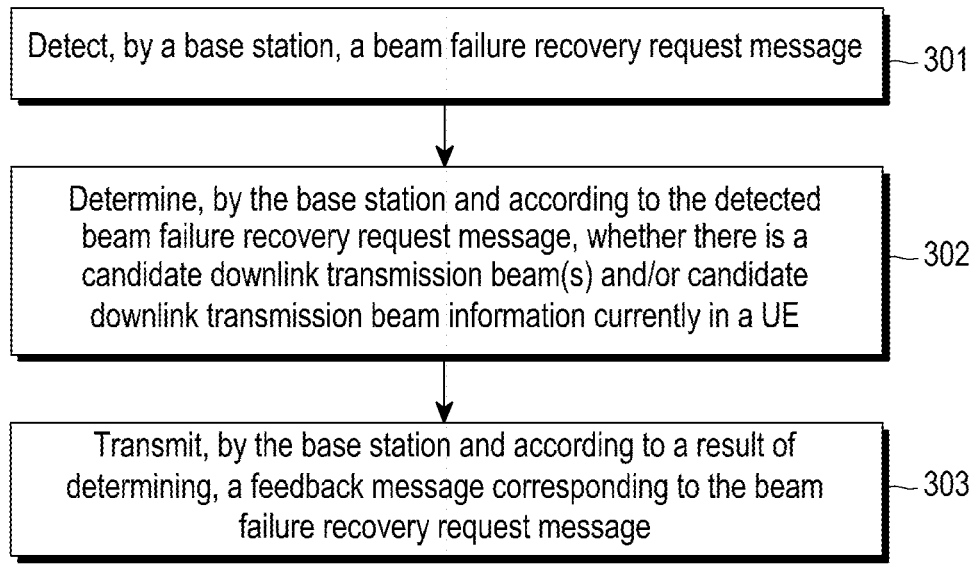
FIG. 4A illustrates a schematic flowchart of another method for transmitting an uplink signal according to an embodiment of the present disclosure.

FIG. 4A is a schematic flowchart of a method for transmitting a downlink signal according to another embodiment of the present disclosure.

Step 301: A base station detects a beam failure recovery request message; step 302: the base station determines, according to the detected beam failure recovery request message, whether there is a candidate downlink transmission beam(s) and/or candidate downlink transmission beam information currently in a UE; and step 303: the base station transmits, according to the result of determination, a feedback message corresponding to the beam failure recovery request message.

Figure 4B:
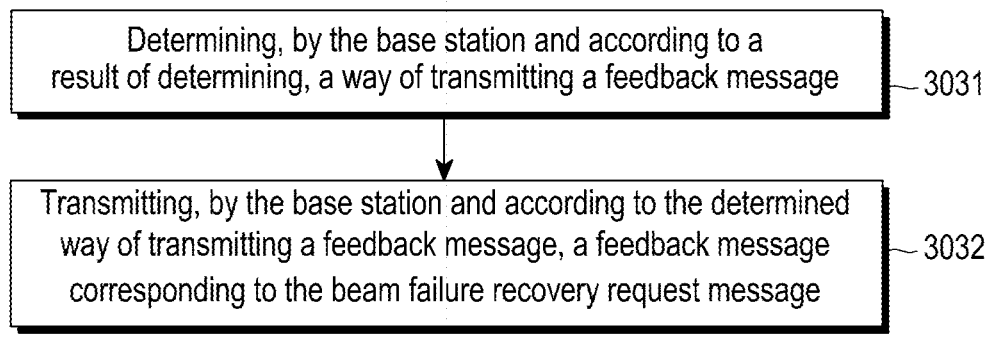
FIG. 4B illustrates a schematic flowchart exemplarily showing the step 303 of FIG. 4A.

FIG. 4B is a schematic flowchart exemplarily showing the step 303 of FIG. 4A.

Referring to FIG. 4B, the step 303 of FIG. 4A may comprise the following steps 3031-3032.

Step 3031: Determining, by the base station and according to the result of determination, a way of transmitting a feedback message; and step 3032: Transmitting, by the base station and according to the determined way of transmitting a feedback message, a feedback message corresponding to the beam failure recovery request message.

Further, the step 303 of FIG. 4A may comprise any one of the following (A, B, C, D, E, F, G and H).

A: If the base station determines that there is no candidate downlink transmission beam currently in the UE, the base station determines multiple available downlink transmission beams, and transmits a feedback message by using the multiple available downlink transmission beams in a polling manner;

B: if the base station determines that there is no candidate downlink transmission beam currently in the UE, the base station determines multiple available downlink transmission beams, randomly selects a downlink transmission beam from the multiple available downlink transmission beams, and transmits the feedback message by this downlink transmission beam;

C: if the base station determines that there is no candidate downlink transmission beam currently in the UE, the base station determines a first downlink transmission beam, and transmits the feedback message to the UE by the first downlink transmission beam. The first downlink transmission beam is a downlink transmission beam which is used by the base station to transmit a feedback message to the UE for the previous time;

D: if the base station determines that there is only one candidate downlink transmission beam currently in the UE, the base station transmits the feedback message to the UE by this candidate downlink transmission beam;

E: if the base station determines that there are multiple candidate downlink transmission beams currently in the UE, the base station transmits the feedback message to the UE by the multiple candidate downlink transmission beams in a polling manner;

F: if the base station determines that there are multiple candidate downlink transmission beams currently in the UE, the base station randomly selects a downlink transmission beam from the multiple candidate downlink transmission beams, and transmits the feedback message to the UE by this downlink transmission beam;

G: if the base station determines that there are multiple candidate downlink transmission beams currently in the UE, the base station may randomly select, from the multiple candidate downlink transmission beams, a downlink transmission beam having a decreased angular deviation from the first downlink transmission beam, and transmits the feedback message to the UE by this downlink transmission beam; and H: if the base station determines that there are multiple candidate downlink transmission beams currently in the UE, the base station selects a second downlink transmission beam from the multiple candidate downlink transmission beams, and transmits the feedback message to the UE by the second downlink transmission beam.

Wherein, the second downlink transmission beam is a downlink transmission beam having a maximum receiving signal power among the multiple candidate downlink transmission beams.

Further, if the base station detects the beam failure recovery request message, and the base station correctly demodulates the reference signal but not the data load, the base station configures an uplink grant and transmits the uplink grant to the UE.

This embodiment of the present disclosure provides methods for transmitting an uplink signal and a downlink signal. In this embodiment of the present disclosure, a UE detects whether there is a beam failure currently, determines whether there is a candidate downlink transmission beam(s) and/or candidate downlink transmission beam information currently if it is detected that there is a beam failure currently, and transmits, according to the result of determination, a beam failure recovery request message to a base station; and, the base station detects the beam failure recovery request message, and determines, according to the detected beam failure recovery request message, whether there is a candidate downlink transmission beam(s) and/or candidate downlink transmission beam information currently in the UE, and transmits, according to the result of determination, a feedback message corresponding to the beam failure recovery request message, wherein the beam failure recovery request message is used for informing the base station of whether there is a candidate downlink transmission beam(s) and/or candidate downlink transmission beam information currently. In other words, in this embodiment of the present disclosure, upon detecting that there is a beam failure and there is a new candidate beam currently, a UE transmits the result of detection to a base station, so that the base station may know that there is a beam failure currently in the UE and that there is a candidate downlink transmission beam(s) currently in the UE. Thus, upon detecting that there is a beam failure, the UE may inform the base station of a new available downlink transmission beam or whether there is a new available downlink transmission beam.

In this embodiment of the present disclosure, the candidate downlink transmission beam may be technically interpreted as a new candidate downlink transmission beam.

In an embodiment of the present disclosure, an uplink transmission way for implicitly informing by a binding relationship will be described here.

Figure 5:
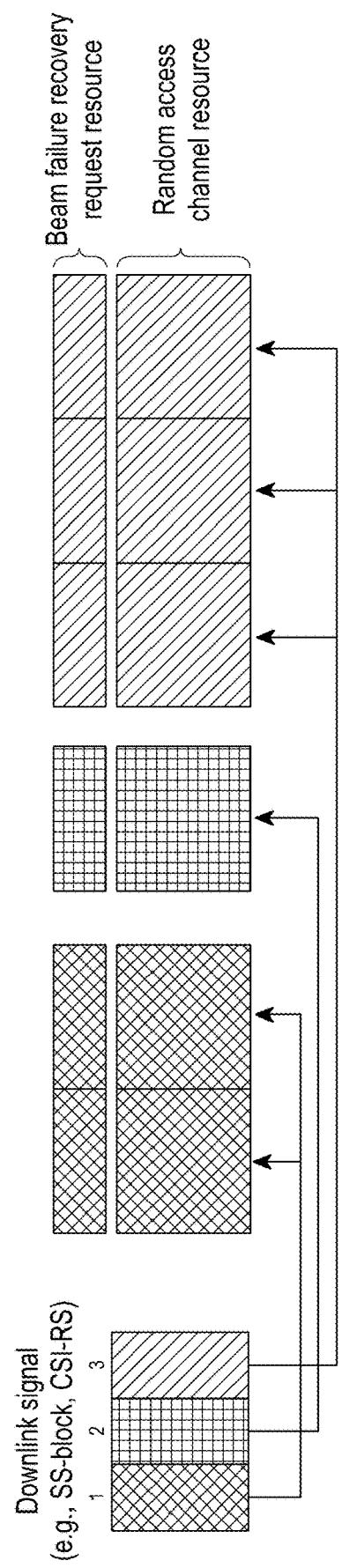
FIG. 5 illustrates a schematic diagram of binding a beam failure recovery request resource and a downlink beam according to an embodiment of the present disclosure.

As shown in FIG. 5, a downlink signal is transmitted by multiple different downlink transmission beams, and the multiple different downlink transmission beams are bound with corresponding random access channel resources. In this embodiment of the present disclosure, it is proposed that the downlink transmission beams are also bound with beam failure recovery request resources.

Wherein, the downlink signal may be a periodic CSI-RS or an SS block. When the downlink transmission beam is bound with a beam failure recovery request resource, the downlink transmission beam may be a downlink transmission beam index (DL Tx beam ID), an SS block index or a Channel State Information Reference Signal Index (CSI-RS Index).

Figure 6:
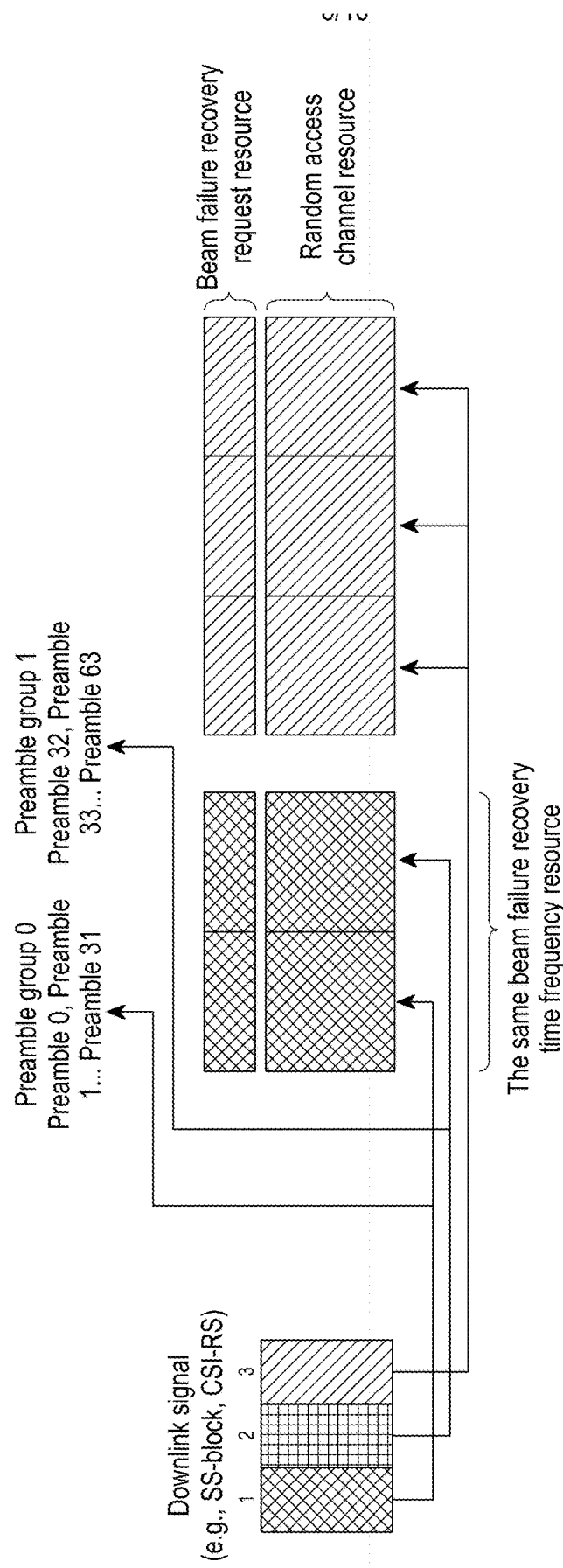
FIG. 6 illustrates a schematic diagram of binding a downlink transmission beam and a beam failure recovery request preamble group according to an embodiment of the present disclosure.

Wherein, as shown in FIG. 5, the beam failure recovery request resource may be a time-frequency resource for transmitting a beam failure recovery signal, or a beam failure recovery signal resource (e.g., a beam failure recovery request preamble resource). When multiple downlink transmission beams are bound with a same time-frequency resource for transmitting the beam failure recovery signal, beam failure recovery request preambles may be divided into groups, and the different downlink transmission beams are distinguished by different groups. As shown in FIG. 6, when downlink transmission beams 1 and 2 are bound with a same time-frequency resource for the beam failure recovery request, in order to distinguish the two downlink transmission beams, N (e.g., N=64) available beam failure recovery request preambles are divided into two groups. Then, the downlink transmission beam 1 is bound with the beam failure recovery request preamble group 0, and the downlink transmission beam 2 is bound with the beam failure recovery request preamble group 1. When the base station detects that the beam failure recovery request preamble is from the group 0, the base station may infer that the new candidate downlink transmission beam implicitly informed by the UE is the downlink transmission beam 1.

Particularly, when the beam failure recovery request resource is a time-frequency resource for the beam failure recovery request, the time-domain position of the beam failure recovery request resource may be the same as that of the corresponding random access channel resource. The corresponding random access channel resource refers to a random access channel resource bound with the same downlink transmission beam. As shown in FIG. 6, the time-domain position of the beam failure recovery request resource corresponding to the downlink transmission beam 1 is the same as that of the random access channel resource corresponding to the downlink transmission beam 1, but the frequency-domain position of the beam failure recovery request resource is different from that of the random access channel resource.

Accordingly, the flow of determining, by the UE, a beam failure recovery request resource may be as follows.

Step 1: The UE detects, by using a beam failure detection reference signal, that there is a beam failure.

Wherein, an example of detection way may be as follows: if the receiving power of the detected beam failure detection reference signal is less than or equal to a predetermined limit value, the UE decides that there is a beam failure.

Step 2: The UE determines, by using a beam identification reference signal, a possible new candidate beam or whether there is a new candidate downlink transmission beam. The way may be described as below.

a. Measurement is performed by measuring the CSI-RS configured by the network, and the UE acquires, according to the result of measurement, a candidate downlink transmission beam or information about whether there is a new candidate downlink transmission beam. Wherein, the new candidate downlink transmission beam is characterized in that: when the receiving signal power is greater than or equal to a predetermined limit value, specifically, if there is a downlink transmission beam having a corresponding receiving signal power at the UE greater than or equal to the predetermined limit value, the UE indicates that there is a new candidate downlink transmission beam; and, if the corresponding receiving signal power of all the downlink transmission beams at the UE is less than the predetermined limit value, the UE indicates that there is no new candidate downlink transmission beam.

b. Measurement is performed by measuring an SS-Block configured by the network, and the UE acquires, according to the result of measurement, a candidate downlink transmission beam or information about whether there is a new candidate downlink transmission beam. Wherein, the new candidate downlink transmission beam is characterized in that: when the receiving signal power is greater than or equal to a predetermined limit value, specifically, if there is a downlink transmission beam having a corresponding receiving signal power at the UE greater than or equal to the predetermined limit value, the UE indicates that there is a new candidate downlink transmission beam; and, if the corresponding receiving signal power of all the downlink transmission beams at the UE is less than the predetermined limit value, the UE indicates that there is no new candidate downlink transmission beam.

c. Measurement is performed by measuring an SS-Block configured by the network and a CSI-RS for beam management, and the UE acquires, according to the result of measurement, a candidate downlink transmission beam or information about whether there is a new candidate downlink transmission beam. Wherein, the new candidate downlink transmission beam is characterized in that: when the receiving signal power is greater than or equal to a predetermined limit value, specifically, if there is a downlink transmission beam having a corresponding receiving signal power at the UE greater than or equal to the predetermined limit value, the UE indicates that there is a new candidate downlink transmission beam; and, if the corresponding receiving signal power of all the downlink transmission beams at the UE is less than the predetermined limit value, the UE indicates that there is no new candidate downlink transmission beam.

Step 3: The UE transmits a beam failure recovery request.

Wherein, according to whether there is new candidate downlink transmission beam information, the determined new candidate downlink transmission beam and the binding relationship between candidate downlink transmission beams and beam failure recovery request resources (including time-frequency resources and preamble resources), the UE determines a time-frequency resource for transmitting the beam failure recovery request and a signal resource for the beam failure recovery request, for example, a beam failure recovery request preamble. Wherein, when there is a candidate downlink transmission beam(s) in the UE, if the UE may determine an unique beam failure recovery request time-frequency resource (for example, an unique new candidate downlink transmission beam is determined and this downlink transmission beam is bound with an unique beam failure recovery request time-frequency resource, or multiple new candidate downlink transmission beams are determined and the multiple downlink transmission beams are bound with a same and unique beam failure recovery request time-frequency resource), this beam failure recovery request time-frequency resource is determined as a time-frequency resource for transmitting the beam failure recovery request signal.

Figure 7:
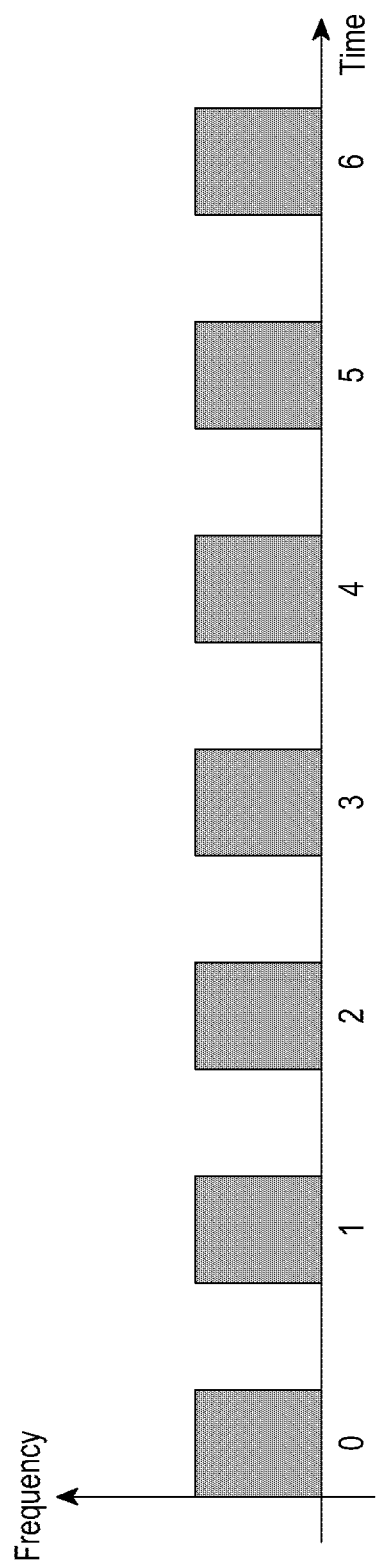
FIG. 7 illustrates a schematic diagram of selecting a time-domain position of an available time-frequency resource for the beam failure recovery request according to an embodiment of the present disclosure.

If the UE detects that there are multiple candidate downlink transmission beams (i.e., corresponding to multiple beam failure recovery request time-frequency resources) or a candidate downlink transmission beam corresponds to multiple beam failure recovery request time-frequency resources, the UE may perform the following operations:

1. selecting, from the available beam failure recovery request time-frequency resources, a beam failure recovery request time-frequency resource in an equiprobable manner to transmit the beam failure recovery request signal; and 2. determining, from the available beam failure recovery request time-frequency resources, a beam failure recovery request time-frequency resource according to a certain priority principle to transmit the beam failure recovery request signal, wherein the certain priority principle may be as follows:

(a) An order of time unit positions of beam failure recovery request time-frequency resources. For example, a beam failure recovery request time-frequency resource at a former time unit position has a higher priority, while a beam failure recovery request time-frequency resource at a later time unit position has a lower priority. As shown in FIG. 7, if the available beam failure recovery request time-frequency resources are ordered in 0 to 6 time units, the beam failure recovery request time-frequency resource 0 has the highest priority, and is preferentially selected by the UE. However, if the UE is unable to perform transmission on the beam failure recovery request time-frequency resource 0 (for example, due to a processing delay, the signal may not be prepared well on the beam failure recovery request time-frequency resource 0), the UE will postpone to a beam failure recovery request time-frequency resource having the highest priority and capable of transmitting the signal.

Figure 8:
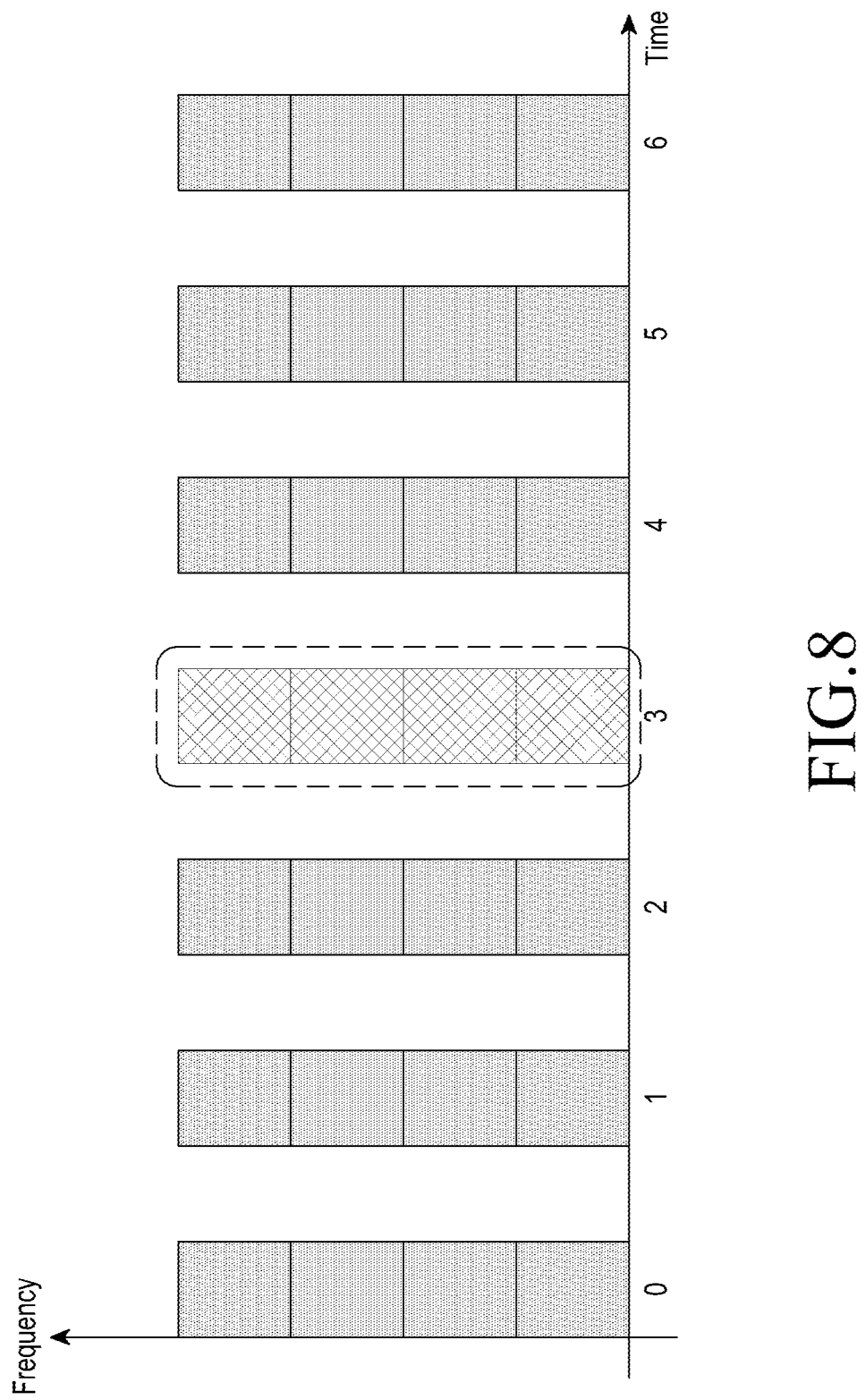
FIG. 8 illustrates a schematic diagram of selecting a frequency position of an available time-frequency resource for the beam failure recovery request according to an embodiment of the present disclosure.

(b) The order of time unit positions of beam failure recovery request time-frequency resources is used as priority, and a frequency position of a beam failure recovery request time-frequency resource is randomly selected from the frequency unit positions of multiple beam failure recovery request time-frequency resources at the selected time unit position in an equiprobable manner. As shown in FIG. 8, after the time position 3 of the beam failure recovery request time-frequency resource is selected, a frequency position of a beam failure recovery request time-frequency resource is randomly selected from frequency positions 0 to 3 in an equiprobable manner.

In this embodiment of the present disclosure, if the UE acquires, according to the binding relationship, a set of multiple available beam failure recovery request preambles, the UE randomly selects a beam failure recovery request preamble from this set in an equiprobable manner. However, if the multiple new candidate downlink transmission beams obtained by the UE are bound with a same time-frequency resource, then:

1. If the multiple new candidate downlink transmission beams are bound with different sets of beam failure recovery request preambles, as shown in FIG. 6, the UE randomly selects, according to the set of beam failure recovery request preambles bound with the selected new candidate downlink transmission beam, a beam failure recovery request preamble from this set in an equiprobable manner; and 2. if the multiple new candidate downlink transmission beams are bound with a same set of beam failure recovery request preambles, the UE randomly selects a beam failure recovery request preamble from the available set and then transmits this beam failure recovery request preamble; and if the base station may successfully detect this beam failure recovery request preamble, the base station may determine that there are multiple corresponding new candidate downlink transmission beams in the UE transmitting this beam failure recovery request preamble.

Wherein, the way of acquiring the configured beam failure recovery request resources and the binding relationship between the downlink transmission beams and the beam failure recovery request resources may be realized by the UE by using a downlink control channel, a downlink broadcast channel or a downlink shared channel.

In this embodiment of the present disclosure, the determined new candidate downlink transmission beam may be:

1. a downlink transmission beam with the highest receiving signal power, or a downlink transmission beam randomly selected from multiple downlink transmission beams with the highest receiving signal power;

2. multiple downlink transmission beams with the highest receiving signal power;

3. a downlink transmission beam with a receiving signal power greater than a predetermined threshold, or a downlink transmission beam randomly selected from multiple downlink transmission beams with a receiving signal power greater than the predetermined threshold; and 4. multiple downlink transmission beams with a receiving signal power greater than the predetermined threshold.

Figure 9:
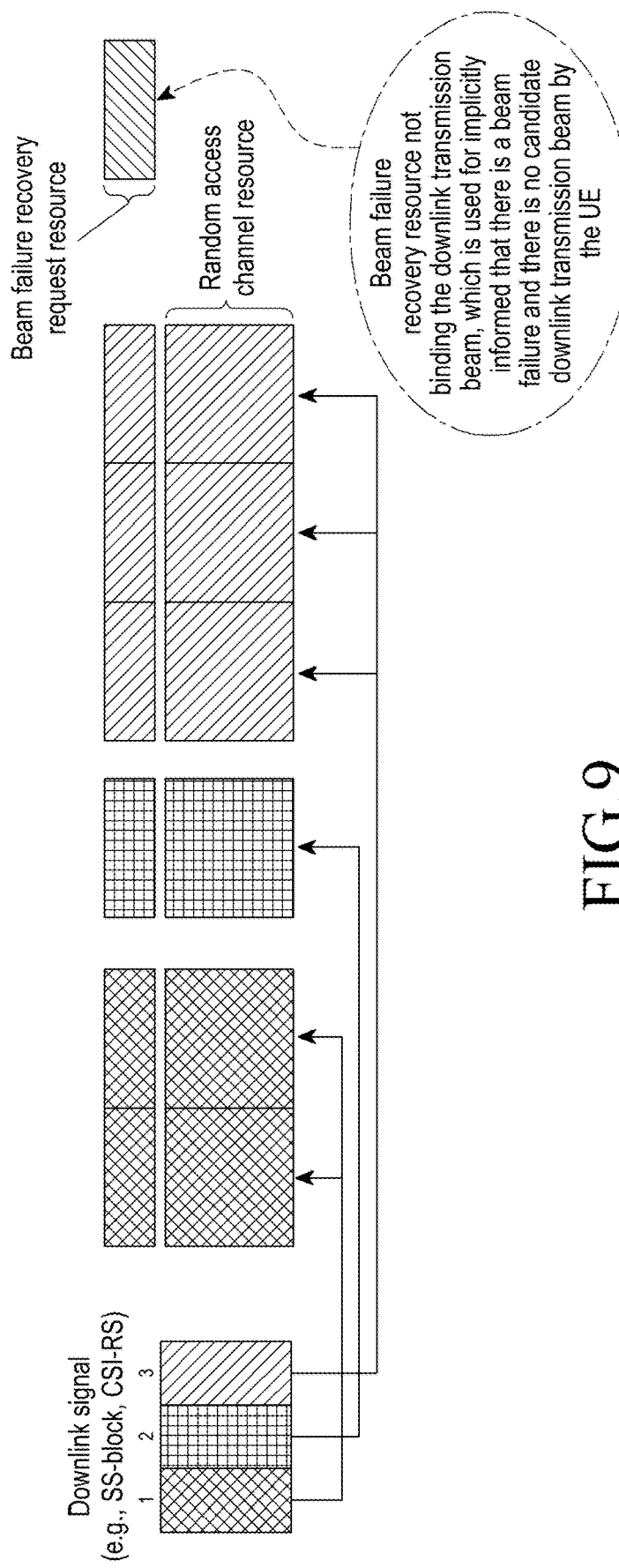
FIG. 9 illustrates a schematic diagram of implicitly informing of no new candidate downlink transmission beam according to an embodiment of the present disclosure.

In this embodiment of the present disclosure, when the UE fails to determine a new candidate downlink transmission beam, a beam failure recovery request resource for indicating that the UE determines a beam failure but fails to bind any downlink transmission beam is obtained through the obtained network configuration. Here, the beam failure recovery request resource may be:

1. a beam failure recovery request time-frequency resource, wherein, as shown in FIG. 9, when the base station detects any beam failure recovery request signal on this beam failure recovery request time-frequency resource, the base station decides that there is a beam failure but no determined new candidate downlink transmission beam in the UE transmitting this signal; and 2. a set of beam failure recovery request signal resources (e.g., preamble resources), wherein, if this set exists, this set contains at least one available beam failure recovery request signal resource; when the base station detects, on any beam failure recovery request time-frequency resource, a beam failure recovery request signal belonging to this set of beam failure recovery request signal resources, the base station detects that there is a beam failure but no determined new candidate downlink transmission beam in the UE transmitting this signal.

Step 4: The UE tries to receive a beam failure recovery request feedback from the base station. The UE will monitor, within the determined control channel search space and by using a particular scrambling code, the beam failure recovery request feedback possibly transmitted by the base station.

Wherein, the determined control channel search space may be: a downlink control channel search space between the UE and the base station for the last time; a reference control channel search space configured by the base station; or a particular control channel search space configured by the UE when the UE is in an accessed state, the particular control channel search space being used for searching the beam failure recovery request feedback. The particular scrambling code may be: a BFR-RNTI, which is calculated in a manner similar to a random access radio network temporary identifier and is related to the position of the time-frequency resource for transmitting the beam failure recovery request of the UE; a C-RNTI, when the base station may determine the identity of the UE transmitting the beam failure recovery request signal, wherein:

when the base station successfully detects a beam failure recovery request signal and determines, from the detected beam failure recovery request signal, that there are N new candidate downlink transmission beams in the UE transmitting this signal, then:

when N=0, the base station may perform the following operations:

a) using multiple possible downlink transmission beams to transmit a beam failure recovery request feedback signal in a polling manner;

b) selecting a downlink transmission beam to transmit a beam failure recovery request feedback signal, where the principle is as follows:

i. randomly selecting one downlink transmission beam from multiple available downlink transmission beams in an equiprobable manner; and ii. preferentially selecting a downlink transmission beam having a small angular deviation from the downlink transmission beam used by the UE for the last time; and c) using the downlink transmission beam used by the UE for the last time to transmit a beam failure recovery request feedback signal;

when N=1, the base station selects this downlink transmission beam to transmit a beam failure recovery request feedback signal; and when N>1, the base station may adopt the following ways:

a) using the N downlink transmission beams informed by the UE to transmit a beam failure recovery request feedback signal in a polling manner; and b) selecting a downlink transmission beam from the informed N candidate downlink transmission beams to transmit a beam failure recovery request feedback signal (the N may be less than the number of downlink transmission beams available for the base station; for example, there are total 16 available downlink beams for the base station, but the user informs N=4 candidate downlink transmission beams), where the principle is as follows:

i. randomly selecting one downlink transmission beam from the N downlink transmission beams in an equiprobable manner; and ii. preferentially selecting, from the N candidate beams, a downlink transmission beam having a small angular deviation from the downlink transmission beam used by the UE for the last time.

In this embodiment of the present disclosure, the beam failure recovery request response signal may comprise a new timing advance, an uplink grant or more.

In this embodiment of the present disclosure, when the UE fails to receive a correct beam failure recovery request response signal within the determined control channel search space, the UE may perform the following operations.

1. The UE returns to the step 3 where a beam failure recovery request signal is transmitted, wherein the value of a counter for the beam failure recovery request signal will be increased by 1, and the value of the counter for the beam failure recovery request signal should be less than or equal to the maximum permissible number of transmissions of the beam failure recovery request signal. Meanwhile, when the beam failure recovery request signal is retransmitted once, the transmitting power is increased once at a given power prompt interval $\Delta P$. When the number of transmissions of the beam failure recovery request exceeds the maximum permissible number of transmissions and the beam failure is still not recovered, the UE reports a higher layer that the beam failure recovery request is failed. For example, if the power of the beam failure recovery request signal transmitted this time is P, but the UE fails to detect a correct beam failure recovery request response signal and the number of transmissions is within the maximum permissible number of transmissions of the beam failure recovery request signal, the user transmits a beam failure recovery request signal next time by using $P+\Delta P$.

2. The UE directly reports the higher layer that the beam failure recovery request is failed.

In an embodiment of the present disclosure, the uplink transmission way for explicitly informing in a scheduling-free manner provided by the present disclosure will be described here. A UE transmits a beam failure recovery request to a base station in a scheduling-free manner.

Figure 10:
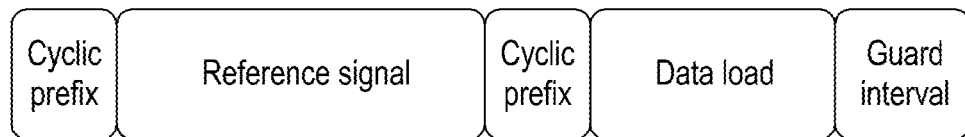
FIG. 10 illustrates a schematic structure diagram of a channel for transmitting a beam failure recovery request in a scheduling-free manner according to an embodiment of the present disclosure.

As shown in FIG. 10, the UE transmits a beam failure recovery request by using a channel structure combining a reference signal and a data load, wherein, in the channel structure combining the reference signal and the data load, the position of the reference signal and the position of the data load may be exchanged, that is, cyclic prefix+data load+cyclic prefix+reference signal+guard interval; the reference signal may be a Demodulation Reference Signal (DMRS) or a preamble sequence; and the both may be used for channel estimation, wherein:

1. when the reference signal is allocated to the UE by the base station, that is, the reference signal is a reference signal specific to the UE, the data load of the UE contains:

a) a new candidate downlink transmission beam existence indicator, for example, 1-bit new candidate downlink transmission beam existence indicator, wherein "1" indicates that there is a new candidate downlink transmission beam in the UE transmitting the beam failure recovery request, and "0" indicates that there is no new candidate downlink transmission beam in the UE transmitting the beam failure recovery request;

b) when the UE determines that there is a new candidate downlink transmission beam, one or more specific downlink transmission beam indexes may be put into the data load and then informed to the base station.

Wherein, the downlink transmission beam index may be a beam identification reference signal index. For example, when the beam identification reference signal is a synchronous signal block, the downlink transmission beam index is a synchronous signal block index; and, when the beam identification reference signal is a channel state information-reference signal configured by the base station for beam management, the downlink transmission beam index is a channel state information-reference signal index.

2. When the reference signal is a reference signal randomly selected, by the UE, from a group of reference signals configured by the base station, the data load of the UE contains:

a) a unique identifier of the UE, for example, a C-RNTI of the UE, or a Serving-Temporary Mobile Subscriber Identity (S-TMSI), or a random number generated by the UE;

b) a new candidate downlink transmission beam existence indicator, for example, 1-bit new candidate downlink transmission beam existence indicator, wherein "1" indicates that there is a new candidate downlink transmission beam in the UE transmitting the beam failure recovery request, and "0" indicates that there is no new candidate downlink transmission beam in the UE transmitting the beam failure recovery request.

In this embodiment of the present disclosure, when the UE determines that there is a new candidate downlink transmission beam, one or more specific downlink transmission beam indexes may be put into the data load and then informed to the base station.

Wherein, the downlink transmission beam index may be a beam identification reference signal index. For example, when the beam identification reference signal is a synchronous signal block, the downlink transmission beam index is a synchronous signal block index; and, when the beam identification reference signal is a channel state information reference signal configured by the base station for beam management, the downlink transmission beam index is a channel state information reference signal index.

Accordingly, the flow of determining, by the UE, a beam failure recovery request resource is as follows.

Step 1: The UE detects, by using a beam failure detection reference signal, that there is a beam failure. Wherein, the specific detection way may be as follows: if the receiving power of the detected beam failure detection reference signal is less than or equal to a predetermined limit value, the UE determines that there is a beam failure.

Step 2: The UE determines, by using a beam identification reference signal, a possible new candidate beam or whether there is a new candidate downlink transmission beam. The way may be as follows:

1. measurement is performed by measuring the CSI-RS configured by the network for beam management, and the UE acquires, according to the result of measurement, a candidate downlink transmission beam or information about whether there is a new candidate downlink transmission beam, wherein the new candidate downlink transmission beam is characterized in that: when the receiving signal power is greater than or equal to a predetermined limit value, specifically, if there is a downlink transmission beam having a corresponding receiving signal power at the UE greater than or equal to the predetermined limit value, the UE indicates that there is a new candidate downlink transmission beam; and, if the corresponding receiving signal power of all the downlink transmission beams at the UE is less than the predetermined limit value, the UE indicates that there is no new candidate downlink transmission beam;

2. measurement is performed by measuring an SS-Block configured by the network, and the UE acquires, according to the result of measurement, a candidate downlink transmission beam or information about whether there is a new candidate downlink transmission beam, wherein the new candidate downlink transmission beam is characterized in that: when the receiving signal power is greater than or equal to a predetermined limit value, specifically, if there is a downlink transmission beam having a corresponding receiving signal power at the UE greater than or equal to the predetermined limit value, the UE indicates that there is a new candidate downlink transmission beam; and, if the corresponding receiving signal power of all the downlink transmission beams at the UE is less than the predetermined limit value, the UE indicates that there is no new candidate downlink transmission beam; and 3. measurement is performed by measuring an SS-Block configured by the network and a CSI-RS for beam management, and the UE acquires, according to the result of measurement, a candidate downlink transmission beam or information about whether there is a new candidate downlink transmission beam, wherein the new candidate downlink transmission beam is characterized in that, when the receiving signal power is greater than or equal to a predetermined limit value, specifically, if there is a downlink transmission beam having a corresponding receiving signal power at the UE greater than or equal to the predetermined limit value, the UE indicates that there is a new candidate downlink transmission beam; and, if the corresponding receiving signal power of all the downlink transmission beams at the UE is less than the predetermined limit value, the UE indicates that there is no new candidate downlink transmission beam.

Step 3: The UE transmits a beam failure recovery request.

In this embodiment of the present disclosure, the UE determines, according to the configuration information of the base station, the position of a time-frequency resource for transmitting the beam failure recovery request, power information and Modulation and Coding Scheme (MCS) configuration, and determines the constitution of the reference signal and data load in the beam failure recovery request signal.

In this embodiment of the present disclosure, if the base station configures multiple available time-frequency resources, the UE randomly selects, from the multiple configured available time-frequency resources and in an equiprobable manner, a time-frequency resource to transmit the beam failure recovery request in a scheduling-free manner.

In this embodiment of the present disclosure, when the reference signal is a reference signal specific to the UE, the data load at least comprises a new candidate downlink transmission beam existence indicator, and/or one or more new candidate downlink transmission beam index determined by the UE. Particularly:

1. The order of reporting is arranged according to the receiving power of the detected downlink transmission beams.

For example, if the base station transmits five downlink transmission beams having an index from 0 to 4, the UE detects downlink beams 1 to 3, and the receiving power (e.g., Reference Signal Receiving Power (RSRP)) of the three beams is #2>#3>#1, new candidate downlink transmission beam indexes are reported in an order of 2, 3 and 1.

2. Only one downlink transmission beam index having the highest receiving power is reported.

For example, if the base station transmits five downlink transmission beams having an index from 0 to 4, the UE detects downlink transmission beams corresponding to #1 to #3, and the receiving power (e.g., RSRP) of the three beams is #2>#3>#1, only the downlink transmission beam index 2 is reported when reporting the new candidate downlink transmission beam indexes; and, if there are multiple downlink transmission beams having the highest receiving power, one downlink transmission beam is selected from the multiple downlink transmission beams in an equiprobable manner for reporting. For example, if beams #2 and #3 are identical and highest in receiving power, the UE randomly selects one from 2 and 3 for reporting.

In this embodiment of the present disclosure, when the reference signal is a signal not specific to the UE, for example, a reference signal randomly selected from a set of available reference signals by the UE, the data load should also at least comprise a unique identifier of the UE, for example, C-RNTI of the UE, S-TMSI or a random number generated by the UE itself.

In this embodiment of the present disclosure, the configuration information of the base station is informed to the UE by the base station through a downlink broadcast channel, a downlink control channel or a downlink shared channel.

Step 4: The UE tries to receive a beam failure recovery request feedback from the base station.

In this embodiment of the present disclosure, the UE will monitor, within the determined control channel search space and by using a particular scrambling code, the beam failure recovery request feedback possibly transmitted by the base station. Wherein, the determined control channel search space may be:

1. a downlink control channel search space between the UE and the base station for the last time;
2. a reference control channel search space configured by the base station; and 3. a particular control channel search space for searching the beam failure recovery request feedback configured by the UE when the UE is in an accessed state.

Wherein, the particular scrambling code may be:

1. a BFR-RNTI, which is calculated in a manner similar to a random access radio network temporary identifier and is related to the position of the time-frequency resource for transmitting the beam failure recovery request of the UE;
2. a C-RNTI, which is a C-RNTI reported in the data load by the UE;
3. an S-TMSI, which is an S-TMSI reported in the data load by the UE; and
4. a particular random number, which is a random number reported in the data load by the UE.

For this embodiment of the present disclosure, when the base station successfully detects the beam failure recovery request signal (i.e., correctly detects the reference signal and correctly demodulates the data load) and determines, from the detected beam failure recovery request signal, that there are N new candidate downlink transmission beams in the UE transmitting this signal, then:

1. when N=0, the base station may perform the following operations:
   a) using multiple possible downlink transmission beams to transmit the beam failure recovery request feedback signal in a polling manner;
   b) selecting a downlink transmission beam to transmit the beam failure recovery request feedback signal, where the principle is as follows:
   i. randomly selecting one downlink transmission beam from multiple downlink transmission beams in an equiprobable manner; and
   ii. preferentially selecting a downlink transmission beam having a small angular deviation from the downlink transmission beam used by the UE for the last time; and
   c) using the downlink transmission beam used by the UE for the last time to transmit the beam failure recovery request feedback signal;
2. when N=1, the base station selects this downlink transmission beam to transmit a beam failure recovery request feedback signal; and
3. when N>1, the base station may perform the following operations:
   a) using the N downlink transmission beams informed by the UE to transmit the beam failure recovery request feedback signal in a polling manner;
   b) selecting a downlink transmission beam from the N informed candidate downlink transmission beams to transmit the beam failure recovery request feedback signal (the N may be less than the number of downlink transmission beams available for the base station; for example, there are total 16 available downlink beams for the base station, but the user informs N=4 candidate downlink transmission beams), where the principle is as follows:
   i. randomly selecting one downlink transmission beam from the N downlink transmission beams in an equiprobable manner; and
   ii. preferentially selecting, from the N candidate downlink beams, a downlink transmission beam having a small angular deviation from the downlink transmission beam used by the UE for the last time; and
   iii. selecting, from the downlink transmission beams, a downlink transmission beam having the highest receiving signal power, for example, the top one among the N downlink transmission beams, wherein the beam failure recovery request response signal may comprise a new timing advance, an uplink grant or more.

In this embodiment of the present disclosure, when the base station successfully detects the reference signal in the beam failure recovery request signal but fails to correctly demodulates the data load, it is indicated that the base station knows that there is a beam failure in the UE transmitting this request signal, and an uplink grant is configured in the beam failure recovery request response signal so that the UE may report whether there is a new candidate downlink transmission beam(s) or one or more new candidate downlink transmission beam index.

In this embodiment of the present disclosure, when the UE fails to receive a correct beam failure recovery request response signal within the determined control channel search space, the UE may perform the following operations.

1. The UE returns to the step 3 where a beam failure recovery request signal is transmitted.

Wherein, the value of a counter for the beam failure recovery request signal will be increased by 1, and the value of the counter for the beam failure recovery request signal should be less than or equal to the maximum permissible number of transmissions of the beam failure recovery request signal. When the number of transmissions of the beam failure recovery request signal exceeds the maximum permissible number of transmissions and the beam failure is not yet recovered, the UE reports a higher layer that the beam failure recovery request is failed.

2. The UE directly reports the higher layer that the beam failure recovery request is failed.

In an embodiment of the present disclosure, the uplink transmission way for explicitly informing by the obtained uplink channel signal provided by the present disclosure will be described here.

In this embodiment of the present disclosure, the UE transmits a beam failure recovery request signal through an uplink channel:

1. A beam failure state, a new candidate downlink transmission beam existence state and (one or more) new candidate downlink transmission beam indexes are directly reported by a PUCCH, for example:

a) 1-bit beam failure state, wherein "1" represents a beam failure and "0" represents no beam failure;

b) 1-bit new candidate downlink transmission beam existence state, wherein "1" indicates that there is a new candidate downlink transmission beam and "0" indicates that there is no new candidate downlink transmission beam;

c) M N-bit new candidate downlink transmission beam indexes, wherein, if the base station has four downlink transmission beams and three of the downlink transmission beams are candidate downlink transmission beams determined by the UE, three 2-bit new candidate downlink transmission beams are used.

In this embodiment of the present disclosure, after a scheduling request is transmitted by a PUCCH to acquire an uplink grant, the UE reports, in a PUSCH, a beam failure state, a new candidate downlink transmission beam existence state and (one or more) new candidate downlink transmission beam indexes. The specific process is as described above and will not be repeated here.

Accordingly, the flow of determining, by the UE, a beam failure recovery request resource is as follows.

Step 1: The UE detects, by using a beam failure detection reference signal, that there is a beam failure.

Specifically, the detection way may be as follows: if the receiving power of the detected beam failure detection reference signal is less than or equal to a predetermined limit value, the UE decides that there is a beam failure.

Step 2: The UE determines, by using a beam identification reference signal, a possible new candidate beam or whether there is a new candidate downlink transmission beam.

Wherein, the way of determining a possible new candidate beam or whether there is a new candidate downlink transmission beam is similar to the description in the forgoing embodiments and will not be repeated here.

Step 3: The UE transmits a beam failure recovery request.

In this embodiment of the present disclosure, the UE determines, according to the configuration information of the base station, the position of a PUCCH time-frequency resource for transmitting the beam failure recovery request. Data of the beam failure state, the new candidate downlink transmission beam existence state and the (one or more) new candidate downlink transmission beam indexes are determined in advance.

In this embodiment of the present disclosure, the configuration information of the base station is informed to the UE by the base station through a downlink broadcast channel, a downlink control channel or a downlink shared channel.

Step 4: The UE tries to receive a beam failure recovery request feedback from the base station. The UE will monitor, within the determined control channel search space and by using a particular scrambling code, the beam failure recovery request feedback possibly transmitted by the base station.

Wherein, the determined control channel search space and the particular scrambling code may refer to the description of the foregoing embodiments and will not be repeated here.

In this embodiment of the present disclosure, when the base station successfully detects a beam failure recovery request signal and determines, from the detected beam failure recovery request signal, that there are N new candidate downlink transmission beams in the UE transmitting this signal, wherein:

1. when N=0, the base station may perform the following operations:

a) using multiple possible downlink transmission beams to transmit the beam failure recovery request feedback signal in a polling manner;

b) selecting a downlink transmission beam to transmit the beam failure recovery request feedback signal, where the principle is as follows:

i. randomly selecting one downlink transmission beam from multiple available downlink transmission beams in an equiprobable manner; and ii. preferentially selecting a downlink transmission beam having a small angular deviation from the downlink transmission beam used by the UE for the last time; and c) using the downlink transmission beam used by the UE for the last time to transmit the beam failure recovery request feedback signal;

2. when N=1, the base station selects this downlink transmission beam to transmit the beam failure recovery request feedback signal; and 3. when N>1, the base station may perform the following operations:

a) using the N downlink transmission beams informed by the UE to transmit the beam failure recovery request feedback signal in a polling manner;

b) selecting a downlink transmission beam from the N informed candidate downlink transmission beams to transmit the beam failure recovery request feedback signal (the N may be less than the number of downlink transmission beams available for the base station; for example, there are total 16 available downlink beams for the base station, but the UE informs N=4 candidate downlink transmission beams), where the principle is as follows:

i. randomly selecting one downlink transmission beam from the N downlink transmission beams in an equiprobable manner;

ii. preferentially selecting, from the N candidate downlink beams, a downlink transmission beam having a small angular deviation from the downlink transmission beam used by the UE for the last time; and iii. selecting, from the downlink transmission beams, a downlink transmission beam having the highest receiving signal power, for example, the top one among the N downlink transmission beams.

In this embodiment of the present disclosure, the beam failure recovery request response signal may comprise a new timing advance, an uplink grant or more.

In this embodiment of the present disclosure, when the UE fails to receive a correct beam failure recovery request response signal within the determined control channel search space, the UE may perform the following operations.

1. The UE returns to the step 3 where a beam failure recovery request signal is transmitted, wherein the value of a counter for the beam failure recovery request signal will be increased by 1, and the value of the counter for the beam failure recovery request signal should be less than or equal to the maximum permissible number of transmissions of the beam failure recovery request signal. When the number of transmissions of the beam failure recovery request exceeds the maximum permissible number of transmissions and the beam failure is not yet recovered, the UE reports a higher layer that the beam failure recovery request is failed.

2. The UE directly reports the higher layer that the beam failure recovery request is failed.

In an embodiment of the present disclosure, the initiation of random access or cell reselection when the UE fails to detect any candidate downlink transmission beam will be described here.

In this embodiment, the processing steps of the UE are as follows.

Step 1: The UE detects, by using a beam failure detection reference signal, that there is a beam failure.

Specifically, the detection way may be as follows: if the receiving power of the detected beam failure detection reference signal is less than or equal to a predetermined limit value, the UE decides that there is a beam failure.

Step 2: The UE determines, by using a beam identification reference signal, a possible new candidate beam or whether there is a new candidate downlink transmission beam.

In this embodiment of the present disclosure, when the UE detects there is an available new candidate downlink transmission beam, the processing method refers to the processing methods in the forgoing embodiments and will not be repeated here.

Particularly, when the UE detects that there is no available new candidate downlink transmission beam, the UE may stop the beam failure recovery and initiate a random access process; or may stop the beam failure recovery and initiate cell reselection.

Figure 11:
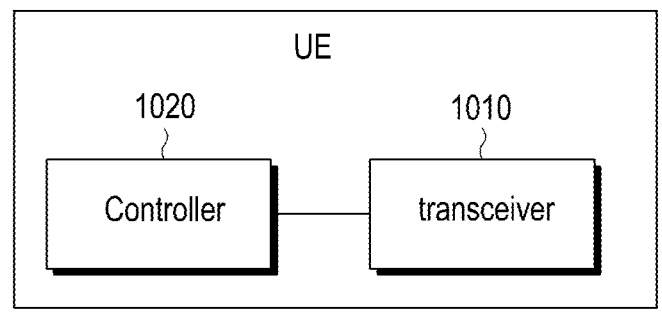
FIG. 11 illustrates a schematic structure diagram of a user equipment according to an embodiment of the present disclosure.

An embodiment of the present disclosure provides a UE, as shown in FIG. 11, comprising a transceiver 1010, a controller 1020, wherein:

the transceiver 1010 is configured to detect whether there is a beam failure currently;

the controller 1020 is configured to determine whether there is a candidate downlink transmission beam(s) and/or candidate downlink transmission beam information when the transceiver 1010 detects that there is a beam failure currently; and the transceiver 1010 is configured to transmit, according to the result of determination of the controller 1020, a beam failure recovery request message to a base station.

Wherein, the beam failure recovery request message is used for informing the base station of whether there is a candidate downlink transmission beam(s) and/or candidate downlink transmission beam information currently.

This embodiment of the present disclosure provides a UE. In this embodiment of the present disclosure, a UE detects whether there is a beam failure currently, determines whether there is a candidate downlink transmission beam(s) and/or candidate downlink transmission beam information currently if it is detected that there is a beam failure currently, and transmits, according to the result of determination, a beam failure recovery request message to a base station; and, the base station detects the beam failure recovery request message, and determines, according to the detected beam failure recovery request message, whether there is a candidate downlink transmission beam(s) and/or candidate downlink transmission beam information currently in the UE, and transmits, according to the result of determination, a feedback message corresponding to the beam failure recovery request message, wherein the beam failure recovery request message is used for informing the base station of whether there is a candidate downlink transmission beam(s) and/or candidate downlink transmission beam information currently. In other words, in this embodiment of the present disclosure, upon detecting that there is a beam failure and there is a new candidate beam currently, a UE transmits the result of detection to a base station, so that the base station may know that there is a beam failure currently in the UE and that there is a candidate downlink transmission beam(s) currently in the UE. Thus, upon detecting that there is a beam failure, the UE may inform the base station of a new available downlink transmission beam or whether there is a new available downlink transmission beam.

The user equipment (UE) provided in this embodiment of the present disclosure may implement the method embodiments described above, and the specific function implementations refer to the descriptions in the method embodiments and will not be repeated here.

Figure 12:
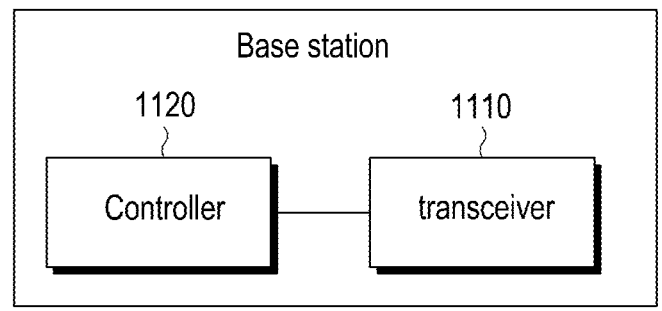
FIG. 12 illustrates a schematic structure diagram of a base station according to an embodiment of the present disclosure.

An embodiment of the present disclosure provides a base station, as shown in FIG. 12, comprising transceiver 1110, a controller 1120 and a transceiver 1110, wherein:

the transceiver 1110 is configured to detect a beam failure recovery request message; the controller 1120 is configured to determine, according to the beam failure recovery request message detected by the transceiver 1110, whether there is a candidate downlink transmission beam(s) and/or candidate downlink transmission beam information currently in a UE; and the transceiver 1110 is configured to transmit, by the base station and according to the result of determination of the controller 1120, a feedback message corresponding to the beam failure recovery request message This embodiment of the present disclosure provides a base station. In this embodiment of the present disclosure, a UE detects whether there is a beam failure currently, determines whether there is a candidate downlink transmission beam(s) and/or candidate downlink transmission beam information currently if it is detected that there is a beam failure currently, and transmits, according to the result of determination, a beam failure recovery request message to a base station; and, the base station detects the beam failure recovery request message, and determines, according to the detected beam failure recovery request message, whether there is a candidate downlink transmission beam(s) and/or candidate downlink transmission beam information currently in the UE, and transmits, according to the result of determination, a feedback message corresponding to the beam failure recovery request message, wherein the beam failure recovery request message is used for informing the base station of whether there is a candidate downlink transmission beam(s) and/or candidate downlink transmission beam information currently. In other words, in this embodiment of the present disclosure, upon detecting that there is a beam failure and there is a new candidate beam currently, a UE transmits the result of detection to a base station, so that the base station may know that there is a beam failure currently in the UE and that there is a candidate downlink transmission beam(s) currently in the UE. Thus, upon detecting that there is a beam failure, the UE may inform the base station of a new available downlink transmission beam or whether there is a new available downlink transmission beam.

The base station provided in this embodiment of the present disclosure may implement the method embodiments described above, and the specific function implementations refer to the descriptions in the method embodiments and will not be repeated here.

It should be understood by those skilled in the art that the present disclosure involves devices for carrying out one or more of operations as described in the present disclosure. Those devices may be specially designed and manufactured as intended, or may comprise well known devices in a general-purpose computer. Those devices have computer programs stored therein, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It should be understood by those skilled in the art that computer program instructions may be used to realize each block in structure diagrams and/or block diagrams and/or flowcharts as well as a combination of blocks in the structure diagrams and/or block diagrams and/or flowcharts. It should be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present disclosure may be alternated, changed, combined or deleted. Further, other steps, measures and solutions in the operations, methods and flows already discussed in the present disclosure may also be alternated, changed, rearranged, decomposed, combined or deleted. Further, the steps, measures and solutions of the prior art in the operations, methods and operations disclosed in the present disclosure may also be alternated, changed, rearranged, decomposed, combined or deleted.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, configuration information including information on at least one reference signal to be used for identifying at least one candidate beam for beam failure recovery and information on a search space for a beam failure recovery response;
   identifying at least one reference signal of which reference signal received power (RSRP) is greater than a predetermined threshold, based on the information on reference signals;
   transmitting, to the base station, a random access preamble for a beam failure recovery request based on the identified at least one reference signal;
   identifying the search space for the beam failure recovery response based on the information on the search space for the beam failure recovery response;
   monitoring a downlink control channel based on the identified search space; and
   receiving, from the base station, the beam failure recovery response on the downlink control channel.

2. The method of claim 1, wherein each of the at least one reference signal is one of a synchronous signal (SS) block or a channel state information-reference signal (CSI-RS).

3. The method of claim 1, further comprising:
   selecting a reference signal from among the identified at least one reference signal;
   identifying an association between the at least one reference signal and at least one resource for the beam failure recovery request; and
   determining a resource corresponding to the selected reference signal based on the identified association for transmitting the beam failure recovery request,
   wherein transmitting of the random access preamble for the beam failure recovery request based on the identified at least one reference signal comprising transmitting the random access preamble for the beam failure recovery request based on the determined resource corresponding to the selected reference signal.

4. The method of claim 3, wherein the random access preamble corresponds to the selected reference signal.

5. The method of claim 1, wherein the downlink control channel is identified by a cell radio network temporary identifier (C-RNTI).

6. A method performed by a base station in a wireless communication system, the method comprising:
   transmitting, to a terminal, configuration information including information on at least one reference signal to be used for identifying at least one candidate beam for beam failure recovery and information on a search space for a beam failure recovery response;
   receiving, from the terminal, a random access preamble for a beam failure recovery request, based on the at least one reference signal of which a reference signal received power (RSRP) is greater than a predetermined threshold; and
   transmitting the beam failure recovery response on a downlink control channel based on the search space identified by the information on the search space for the beam failure recovery response.

7. The method of claim 6, wherein each of the at least one reference signal is one of a synchronous signal (SS) block or a channel state information-reference signal (CSI-RS).

8. The method of claim 6, wherein receiving of the random access preamble for the beam failure recovery request comprising:
   receiving the random access preamble for the beam failure recovery request based on a resource associated with a reference signal selected, by the terminal, from among the at least one reference signal.

9. The method of claim 8, wherein the random access preamble corresponds to the reference signal selected by the terminal.

10. The method of claim 6, wherein the downlink control channel is identified by a cell radio network temporary identifier (C-RNTI).

11. A terminal for transmitting a beam failure recovery request, the terminal comprising:
    a transceiver; and
    a processor coupled with the transceiver and configured to:

receive, from a base station, configuration information including information on at least one reference signal to be used for identifying at least one candidate beam for beam failure recovery and information on a search space for a beam failure recovery response, identify at least one reference signal of which reference signal received power (RSRP) is greater than a predetermined threshold, based on the information on reference signals, transmit, to the base station, a random access preamble for a beam failure recovery request based on the identified at least one reference signal, identify the search space for the beam failure recovery response based on the information on the search space for the beam failure recovery response, monitor a downlink control channel based on the identified search space, and receive, from the base station, the beam failure recovery response on the downlink control channel.

12. The terminal of claim 11, wherein each of the at least one reference signal is one of a synchronous signal (SS) block or a channel state information-reference signal (CSI-RS).

13. The terminal of claim 11, wherein the processor is further configured to:

select a reference signal from among the identified at least one reference signal, identify an association between the at least one reference signal and at least one resource for the beam failure recovery request, determine a resource corresponding to the selected reference signal based on the identified association for transmitting the beam failure recovery request, and transmit the random access preamble for the beam failure recovery request based on the determined resource corresponding to the selected reference signal.

14. The terminal of claim 13, wherein the random access preamble corresponds to the selected reference signal.

15. The terminal of claim 11, wherein the downlink control channel is identified by a cell radio network temporary identifier (C-RNTI).

16. A base station for receiving a beam failure recovery request, the base station comprising:

a transceiver; and a processor coupled with the transceiver and configured to:

transmit, to a terminal, configuration information including information on at least one reference signal to be used for identifying at least one candidate beam for beam failure recovery and information on a search space for a beam failure recovery response, receive, from the terminal, a random access preamble for a beam failure recovery request, based on the at least one reference signal of which a reference signal received power (RSRP) is greater than a predetermined threshold, and transmit the beam failure recovery response on a downlink control channel based on the search space identified by the information on the search space for the beam failure recovery response.

17. The base station of claim 16, wherein each of the at least one reference signal is one of a synchronous signal (SS) block or a channel state information-reference signal (CSI-RS).

18. The base station of claim 16, wherein the processor is further configured to:

receive the random access preamble for the beam failure recovery request based on a resource associated with a reference signal selected, by the terminal, from among the at least one reference signal.

19. The base station of claim 18, wherein the random access preamble corresponds to the selected reference signal selected by the terminal.

20. The base station of claim 16, wherein the downlink control channel is identified by a cell radio network temporary identifier (C-RNTI).

* * * * *